United States Patent
Zhu

(10) Patent No.: US 10,778,496 B2
(45) Date of Patent: Sep. 15, 2020

(54) OFDM SYSTEM SYNCHRONIZATION TRACKING METHOD AND APPARATUS

(71) Applicant: ALL WINNER TECHNOLOGY CO., LTD., Zhuhai, Guangdong (CN)

(72) Inventor: Jiajun Zhu, Guangdong (CN)

(73) Assignee: ALLWINNER TECHNOLOGY CO., LTD., Zhuhai, Guangdong (CN)

( * ) Notice: Subject to any disclaimer, the term of this patent is extended or adjusted under 35 U.S.C. 154(b) by 0 days.

(21) Appl. No.: 16/333,606

(22) PCT Filed: Sep. 11, 2017

(86) PCT No.: PCT/CN2017/101241
§ 371 (c)(1),
(2) Date: Mar. 15, 2019

(87) PCT Pub. No.: WO2018/054236
PCT Pub. Date: Mar. 29, 2018

(65) Prior Publication Data
US 2019/0215206 A1    Jul. 11, 2019

(30) Foreign Application Priority Data

Sep. 26, 2016 (CN) .......................... 2016 1 0855133

(51) Int. Cl.
*H04L 27/26* (2006.01)
*H04L 27/00* (2006.01)
(Continued)

(52) U.S. Cl.
CPC ........ *H04L 27/266* (2013.01); *H04L 27/0014* (2013.01); *H04L 27/265* (2013.01);
(Continued)

(58) Field of Classification Search
CPC . H04L 27/266; H04L 27/265; H04L 27/2672; H04L 27/3455; H04L 27/0014; H04L 27/2675
See application file for complete search history.

(56) References Cited

U.S. PATENT DOCUMENTS

| | | | |
|---|---|---|---|
| 5,287,067 A * | 2/1994 | Denno | H04L 27/2332 329/304 |
| 6,594,320 B1 * | 7/2003 | Sayeed | H04L 27/2659 370/482 |

* cited by examiner

*Primary Examiner* — Jamal Javaid
(74) *Attorney, Agent, or Firm* — Start T Auvinen; gPatent LLC

(57) ABSTRACT

An OFDM system synchronization tracking method includes: A1: performing OFDM symbol segmentation on a received digital signal, performing FFT on OFDM symbols obtained through the segmentation, performing step A2 to A5 on each frequency domain OFDM symbol in a frequency domain OFDM symbol sequence; A2: extracting information subcarrier symbols, pilot symbols, a DC subcarrier from a current frequency domain OFDM symbol, detecting and implementing a decision on the information subcarrier symbols, generating a recovery information subcarrier symbol; A3: recovering the OFDM symbol; A4: performing frequency offset estimation and timing offset estimation on the recovery OFDM symbol; A5: performing phase compensation on a next frequency domain OFDM symbol in the frequency domain OFDM symbol sequence by using a frequency offset estimation phase rotation value and a timing offset estimation phase rotation value, setting the compensated frequency domain OFDM symbol to a current frequency domain OFDM symbol, returning to the step A2.

6 Claims, 3 Drawing Sheets

(51) Int. Cl.
*H04L 27/34* (2006.01)
*H04L 5/00* (2006.01)
(52) U.S. Cl.
CPC ...... *H04L 27/2657* (2013.01); *H04L 27/2672* (2013.01); *H04L 27/2675* (2013.01); *H04L 27/3455* (2013.01); *H04L 5/0007* (2013.01); *H04L 2027/0026* (2013.01); *H04L 2027/0053* (2013.01); *H04L 2027/0067* (2013.01)

ies technologies, specifically, to an OFDM system synchronization tracking method and apparatus, and in particular, to an OFDM system synchronization tracking method and apparatus based on the 802.11a/g/n/ac protocol.

OFDM SYSTEM SYNCHRONIZATION TRACKING METHOD AND APPARATUS

FIELD OF THE INVENTION

The present invention relates to the field of communications technologies, specifically, to an OFDM system synchronization tracking method and apparatus, and in particular, to an OFDM system synchronization tracking method and apparatus based on the 802.11a/g/n/ac protocol.

BACKGROUND OF THE INVENTION

In the 802.11a/g/n/ac protocol, OFDM is an important modulation and demodulation technology which can greatly improve the data transmission rate. However, the OFDM is very sensitive to carrier frequency offset and timing offset. Existence of the frequency offset and the timing offset is likely to cause degraded demodulation performance of a receiver. The frequency offset is due to the carrier frequency deviation between a transmitter and a receiver. The frequency offset may destroy the orthogonality and phase rotation value of the OFDM, and results in serious degradation of demodulation performance of the receiver. Therefore, in a communication process, an OFDM training symbol is usually added to a frame header so that the receiver may estimate and eliminate the frequency offset. However, due to noise, for the initial frequency offset estimation of a frame header of a received frame, it is not ensured that the frequency offset is accurately estimated and completely eliminated, and the frequency offset value just can be controlled within a certain range. The residual frequency offset may continue to affect the demodulation performance of the receiver. Therefore, subsequent frequency offset tracking is very necessary. The timing offset is due to the crystal oscillator frequency difference between the transmitter and the receiver or Doppler frequency drift. The crystal oscillator frequency difference may cause phase drift of a sampling clock, causing the timing offset to vary over time. The timing offset is essentially inevitable for a system. The timing offset may cause subcarrier phase rotation of the OFDM, resulting in degradation of demodulation performance of the receiver. Therefore, after timing synchronization is performed on the frame header, timing offset tracking is also very necessary. In an 802.11a/g/n/ac OFDM system, the protocol stipulates that in each OFDM symbol, several pilots known by the receiver are inserted into an information subcarrier, so that a receiver may perform synchronization tracking operation. In the prior art, there are many synchronization tracking methods performed by using the pilots. However, under impact of noise, the accuracy of frequency offset value and timing offset value that are estimated by a limited quantity of pilots is quite limited, and the demodulation performance cannot be optimized. In addition, in the prior art, frequency offset value estimation and compensation are mostly performed in time domain, thus an inverse Fourier transformer is needed, and the complexity of circuit implementation is very high.

SUMMARY OF THE INVENTION

The present invention provides an OFDM system synchronization tracking method and apparatus, to overcome a defect that accuracy of frequency offset estimation and timing offset estimation is not high due to an OFDM system in the 802.11 protocol in the prior art using a pilot to perform synchronization tracking, and a defect of complex circuit due to frequency offset value estimation and compensation being performed in time domain.

To resolve the foregoing technical problem, the following technical solutions are used in the present invention:

An OFDM system synchronization tracking method includes steps of:

A1. performing OFDM symbol segmentation on a received digital signal, sequentially performing a fast Fourier transform (FFT) on OFDM symbols obtained through the segmentation, transforming the OFDM symbols from time domain to frequency domain to obtain a frequency domain OFDM symbol sequence, and sequentially performing step A2 to step A5 on each frequency domain OFDM symbol in the frequency domain OFDM symbol sequence;

A2. extracting information subcarrier symbols, pilot symbols, and a direct current (DC) subcarrier from a current frequency domain OFDM symbol, detecting and implementing a decision on the information subcarrier symbols, and generating a recovery information subcarrier symbol;

A3. synthesizing the pilot symbols, the DC subcarrier in the current OFDM symbol and the recovery information subcarrier symbol into a recovery OFDM symbol;

A4. performing frequency offset estimation and timing offset estimation on the recovery OFDM symbol, to obtain a corresponding frequency offset estimation phase rotation value and a corresponding timing offset estimation phase rotation value; and A5. performing phase compensation on a next frequency domain OFDM symbol in the frequency domain OFDM symbol sequence by using the frequency offset estimation phase rotation value and the timing offset estimation phase rotation value, setting the compensated frequency domain OFDM symbol to a current frequency domain OFDM symbol, and returning to the step A2.

According to embodiments of the present invention, the step A2 includes: implementing a maximum likelihood hard decision, and generating the recovery information subcarrier symbol.

According to embodiments of the present invention, the step A4 includes: correcting the frequency offset estimation phase rotation value and the timing offset estimation phase rotation value by using loop filters, and calculating a new frequency offset estimation phase rotation value and a new timing offset estimation phase rotation value after the correction.

According to this embodiment of the present invention, the step A4 includes: the loop filters include a frequency offset loop filter and a timing offset loop filter, the frequency offset loop filter is configured to correct the frequency offset estimation phase rotation value, and the timing offset loop filter is configured to correct the timing offset estimation phase rotation value.

An OFDM system synchronization tracking apparatus includes a symbol timer, a fast Fourier transformer, a phase rotation compensator, an information subcarrier extractor, a channel estimator, a detector, a pilot subcarrier extractor, a subcarrier hard decider, an OFDM symbol synthesizer, a frequency offset and timing offset estimator, a frequency offset loop filter, a timing offset loop filter, and a phase rotation estimate calculator. The symbol timer, the fast Fourier transformer, the phase rotation compensator, the information subcarrier extractor, the detector, the subcarrier hard decider, the OFDM symbol synthesizer, the frequency offset and timing offset estimator, the frequency offset loop filter, and the phase rotation estimate calculator are sequentially connected. The phase rotation compensator, the channel estimator, and the detector are sequentially connected.

The information subcarrier extractor, the pilot subcarrier extractor, and the OFDM symbol synthesizer are sequentially connected. The symbol timer is configured to perform OFDM symbol segmentation on a received digital signal, the fast Fourier transformer is configured to sequentially perform an FFT on OFDM symbols obtained through the segmentation, and transform the OFDM symbols from a time domain to a frequency domain to obtain a frequency domain OFDM symbol sequence. The channel estimator is configured to perform channel estimation according to a training sequence transparently transmitted by the phase rotation compensator, to obtain a channel estimate value. The information subcarrier extractor is configured to extract an information subcarrier symbol from a current frequency domain OFDM symbol. The pilot subcarrier extractor is configured to extract a pilot symbol and a DC subcarrier from the current frequency domain OFDM symbol. The detector is configured to detect the information subcarrier symbol. The subcarrier hard decider is configured to render a decision on the information subcarrier symbol and generate a recovery information subcarrier symbol. The OFDM symbol synthesizer is configured to synthesize the pilot symbol and the DC subcarrier in the current OFDM symbol and the recovery information subcarrier symbol into a recovery OFDM symbol. The frequency offset and timing offset estimator is configured to perform frequency offset estimation and timing offset estimation on the recovery OFDM symbol, to obtain a corresponding frequency offset estimation phase rotation value and a corresponding timing offset estimation phase rotation value. The frequency offset loop filter is configured to correct the frequency offset estimation phase rotation value. The timing offset loop filter is configured to correct the timing offset estimation phase rotation value. The phase rotation estimate calculator is configured to calculate the corresponding frequency offset estimation phase rotation value and the corresponding timing offset estimation phase rotation value. The phase rotation compensator is configured to perform phase compensation on a next frequency domain OFDM symbol in the frequency domain OFDM symbol sequence by using the frequency offset estimation phase rotation value and the timing offset estimation phase rotation value, and the compensated frequency domain OFDM symbol is set to a current frequency domain OFDM symbol.

According to embodiments of the present invention, the subcarrier hard decider implements a maximum likelihood hard decision, and generates the recovery information subcarrier symbol.

The present invention has the following beneficial effects: a frequency offset phase rotation value and a timing offset phase rotation value of an OFDM symbol are estimated by combining information subcarrier hard decision feedback and a pilot subcarrier, thereby greatly improving estimation accuracy. In addition, phase rotation compensation is provided for a next OFDM symbol in frequency domain processing part, so that in an entire synchronization tracking process, not only tracking accuracy is improved, but also complexity of circuit timing implementation is reduced.

BRIEF DESCRIPTION OF THE DRAWINGS

The following specifically describes the present invention with reference to the accompanying drawings and in combination with examples, and advantages and implementations of the present invention will become more apparent. Content shown in the accompanying drawings is only used to explain and describe the present invention, but does not constitute any limitation on the present invention in any sense. In the accompanying drawings.

DETAILED DESCRIPTION

Figure 1:
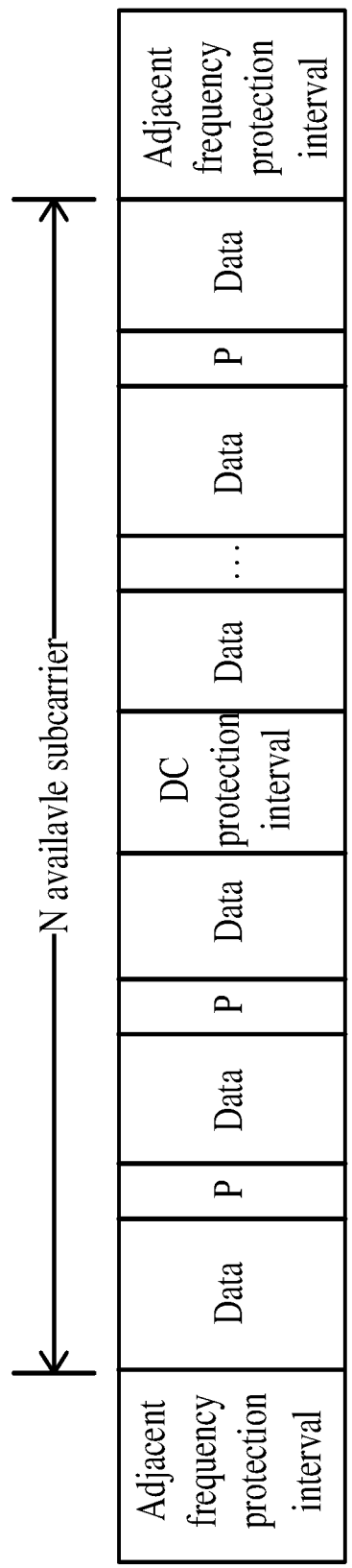
FIG. 1 is a schematic diagram of subcarrier distribution of an 802.11a/g/n/ac OFDM symbol.
Figure 2:
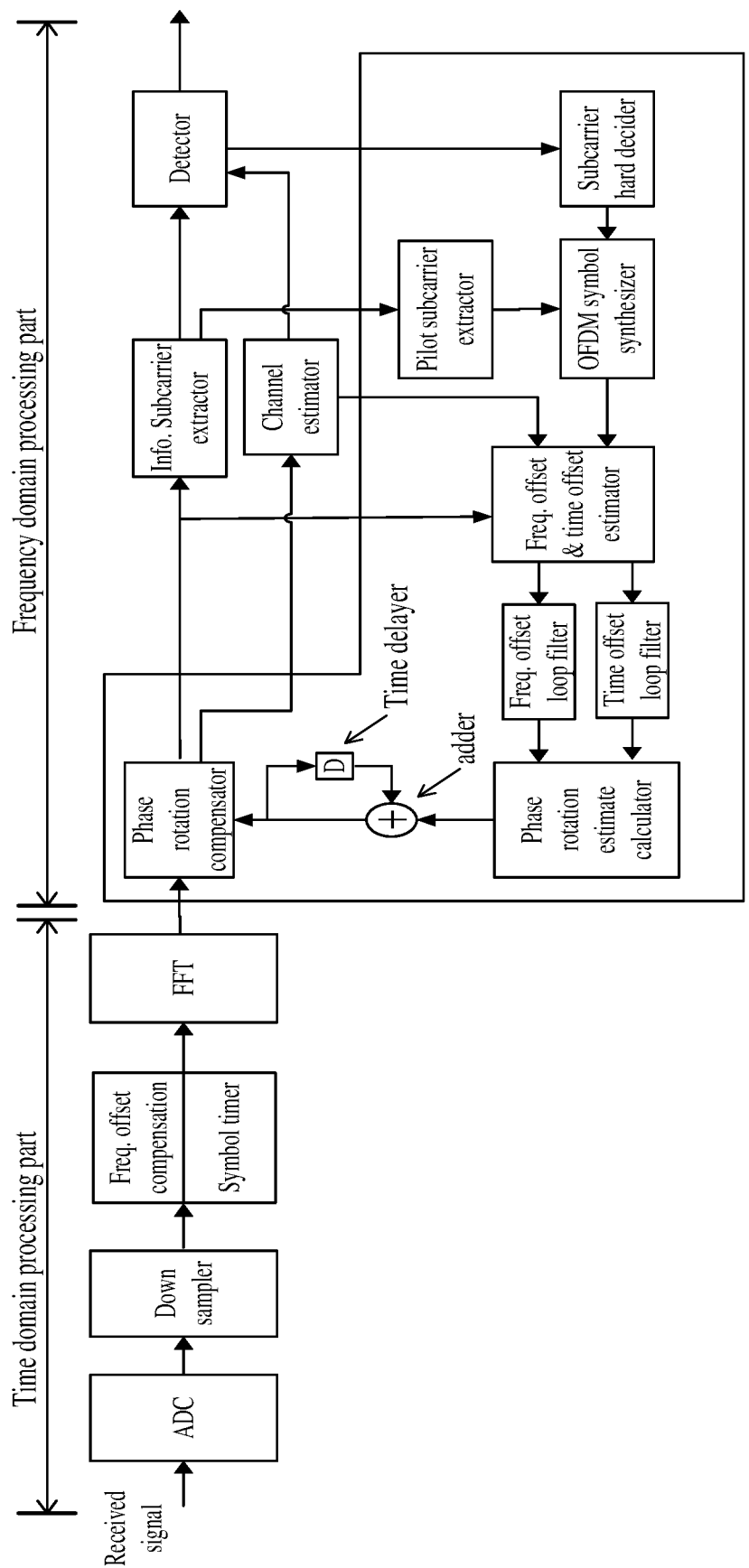
FIG. 2 is a schematic diagram of an apparatus according to the present invention.
Figure 3:
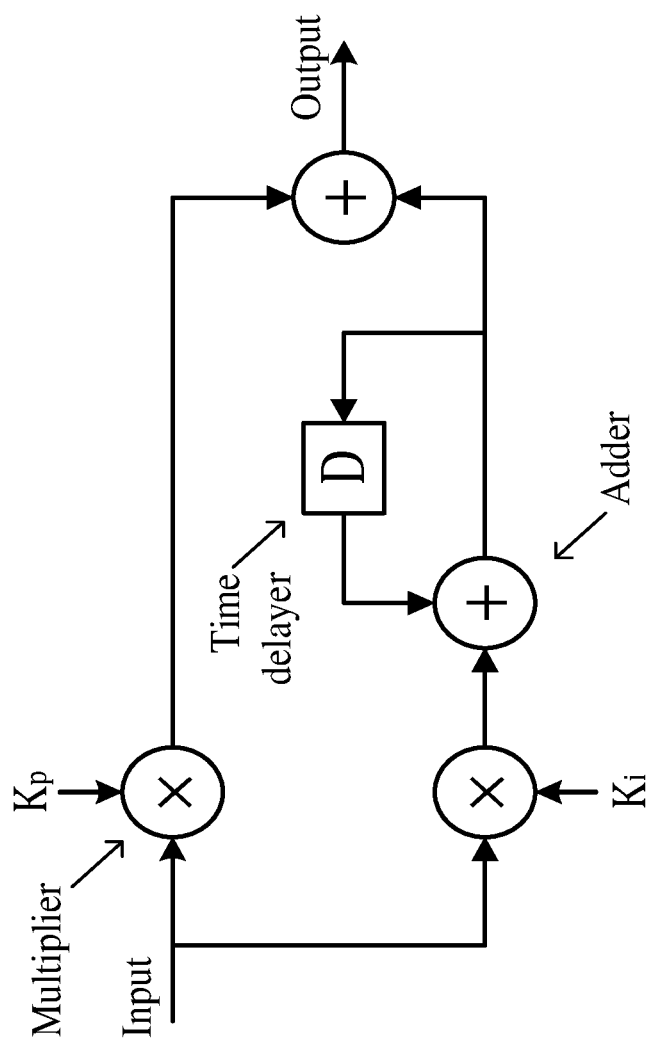
FIG. 3 is a schematic diagram of a loop filter according to the present invention.

As shown in FIG. 1, FIG. 2, and FIG. 3, an OFDM system synchronization tracking method according to the present invention includes steps of:

A1. performing OFDM symbol segmentation on a received digital signal, sequentially performing a Fast Fourier transform (FFT) on OFDM symbols obtained through the division, transforming the OFDM symbols from time domain to frequency domain to obtain a frequency domain OFDM symbol sequence, and sequentially performing step A2 to step A5 on each frequency domain OFDM symbol in the frequency domain OFDM symbol sequence;

A2. extracting information subcarrier symbols, pilot symbols, and a DC subcarrier from a current frequency domain OFDM symbol, detecting and implementing a decision on the information subcarrier symbols, and generating a recovery information subcarrier symbol;

A3. synthesizing the pilot symbols, the DC subcarrier in the current OFDM symbol and the recovery information subcarrier symbol into a recovery OFDM symbol;

A4. performing frequency offset estimation and timing offset estimation on the recovery OFDM symbol, to obtain a corresponding frequency offset estimation phase rotation value and a corresponding timing offset estimation phase rotation value; and A5. performing phase compensation on a next frequency domain OFDM symbol in the frequency domain OFDM symbol sequence by using the frequency offset estimation phase rotation value and the timing offset estimation phase rotation value, setting the compensated frequency domain OFDM symbol to a current frequency domain OFDM symbol, and returning to the step A2.

According to embodiments of the present invention, the step A2 includes: implementing a hard decision by using a maximum likelihood method, and generating the recovery information subcarrier symbol. The step A4 includes: correcting the frequency offset estimation phase rotation value and the timing offset estimation phase rotation value by using loop filters, and calculating a new frequency offset estimation phase rotation value and a new timing offset estimation phase rotation value after the correction. The loop filters include a frequency offset loop filter and a timing offset loop filter. The frequency offset loop filter is configured to correct the frequency offset estimation phase rotation value, and the timing offset loop filter is configured to correct the timing offset estimation phase rotation value.

An OFDM system synchronization tracking apparatus according to the present invention includes a symbol timer, a fast Fourier transformer, a phase rotation compensator, an information subcarrier extractor, a channel estimator, a detector, a pilot subcarrier extractor, a subcarrier hard decider, an OFDM symbol synthesizer, a frequency offset and timing offset estimator, a frequency offset loop filter, a timing offset loop filter, and a phase rotation estimate calculator. The symbol timer, the fast Fourier transformer, the phase rotation compensator, the information subcarrier extractor, the detector, the subcarrier hard decider, the OFDM symbol synthesizer, the frequency offset and timing offset estimator, the frequency offset loop filter, and the phase rotation estimate calculator are sequentially connected. The phase rotation compensator, the channel estimator, and the detector are sequentially connected. The information subcarrier extractor, the pilot subcarrier extractor, and the OFDM symbol synthesizer are sequentially connected. The symbol timer is configured to perform OFDM symbol segmentation on a received digital signal. The fast Fourier transformer is configured to sequentially perform an FFT on OFDM symbols obtained through the segmentation, and transform the OFDM symbols from time domain to frequency domain to obtain a frequency domain OFDM symbol sequence. The channel estimator is configured to perform channel estimation according to a training sequence transparently transmitted by the phase rotation compensator, to obtain a channel estimate value. The information subcarrier extractor is configured to extract an information subcarrier symbol from a current frequency domain OFDM symbol. The pilot subcarrier extractor is configured to extract a pilot symbol and a DC subcarrier from the current frequency domain OFDM symbol. The detector is configured to detect the information subcarrier symbol. The subcarrier hard decider is configured to implement a decision on the information subcarrier symbol and generate a recovery information subcarrier symbol. The OFDM symbol synthesizer is configured to synthesize the pilot symbol and the DC subcarrier in the current OFDM symbol and the recovery information subcarrier symbol into a recovery OFDM symbol. The frequency offset and timing offset estimator is configured to perform frequency offset estimation and timing offset estimation on the recovery OFDM symbol, to obtain a corresponding frequency offset estimation phase rotation value and a corresponding timing offset estimation phase rotation value. The frequency offset loop filter is configured to correct the frequency offset estimation phase rotation value. The timing offset loop filter is configured to correct the timing offset estimation phase rotation value. The phase rotation estimate calculator is configured to calculate the corresponding frequency offset estimation phase rotation value and the corresponding timing offset estimation phase rotation value. The phase rotation compensator is configured to perform phase compensation on a next frequency domain OFDM symbol in the frequency domain OFDM symbol sequence by using the frequency offset estimation phase rotation value and the timing offset estimation phase rotation value, and the compensated frequency domain OFDM symbol is set to a current frequency domain OFDM symbol. According to embodiments of the present invention, the subcarrier hard decider implements a maximum likelihood hard-decision, and generates the recovery information subcarrier symbol.

The following describes the technical solutions of the present invention by using specific embodiments.

A demodulation procedure of a receiver front end is as follows:

1. A received signal is sent to an analog to digital converter through an analog circuit, and is converted from an analog signal into a digital signal.

2. A down-sampler down-samples the digital signal output by the analog to digital converter. The sampling frequency is reduced to a frequency required for baseband demodulation.

3. Frequency offset compensation and symbol timing are used for initial synchronization. The frequency offset compensation reduces frequency offset effect of the received signal by using a frequency offset value estimated in a frame header training symbol. The symbol timer determines a windowing location of an FFT in each OFDM symbol in the frame header training symbol, that is, performs OFDM symbol segmentation on a series of received digital signals.

4. The fast Fourier transformer sequentially performs an FFT on each OFDM symbol obtained through the segmentation, and transforms the OFDM symbol from time domain to frequency domain.

Synchronization Tracking Algorithm Process:

The following describes in detail how the synchronization tracking apparatus of the present invention operates in a demodulation process of a receiver and provides reliable synchronization tracking support for the receiver. In embodiments, it is assumed that an antenna mode is single-input single-output (SISO); the total quantity of tracked OFDM symbols is Y, and the total quantity of available subcarriers (information subcarrier, pilot subcarrier (pilot subcarrier), and DC subcarrier) is N+1; and k represents an index of an available subcarrier of each OFDM symbol, and its representation range is $$\left[-\frac{N}{2}, \frac{N}{2}\right].$$

An operating procedure of the apparatus is as follows:

First step: Set an index y=1. y represents an index of an OFDM symbol on which synchronization tracking is to be performed. y=1 indicates that the OFDM symbol is a first OFDM symbol on which synchronization tracking is performed.

Second step: The phase rotation compensator performs phase compensation on a $y^{th}$ OFDM symbol output by the fast Fourier transformer, that is, corrects a phase rotation error caused by frequency offset and timing offset. A correction algorithm of the phase rotation compensator is expressed as:

$$\tilde{R}_y(k) = R_y(k) e^{-j\hat{\theta}_y(k)} \quad (1)$$

In the equation: (1) $R_y(k)$ represents a $k^{th}$ subcarrier of the $y^{th}$ received OFDM symbol output by the fast Fourier transformer. (2) $e^{-j\hat{\theta}_y(k)}$ is a phase rotation compensation value of the $k^{th}$ subcarrier of the $y^{th}$ OFDM symbol. (3) $\tilde{R}_y(k)$ is the $k^{th}$ subcarrier of the $y^{th}$ OFDM symbol after phase rotation compensation.

The equation (1) may be further expressed as:

$$\tilde{R}_y(k) = [H(k) S_y(k) e^{j\theta_y(k)} + Z_y(k)] \cdot e^{-j\hat{\theta}_y(k)} \quad (2)$$

In the equation: (1) $H(k)$ represents channel estimation information of the $k^{th}$ subcarrier. (2) $S_y(k)$ represents the $k^{th}$ subcarrier of the $y^{th}$ sent OFDM symbol. (3) $e^{j\theta_y(k)}$ represents a phase rotation value of the $k^{th}$ subcarrier of the $y^{th}$ OFDM symbol. (4) $\theta_y(k) = a_y + k \cdot b_y$, where $a_y$ and $b_y$ respectively represent a frequency offset phase rotation value and a timing offset phase rotation value. (5) $Z_y(k)$ represents white Gaussian noise of the $k^{th}$ subcarrier.

When y=1, $\hat{\theta}_1(k)=0$. Therefore, the first tracked OFDM symbol has no phase rotation compensation.

Third step: After the detector detects an information subcarrier of the $y^{th}$ OFDM symbol, the detected information subcarrier $\hat{S}_y(k)$ is to be sent to the subcarrier hard decider for a maximum likelihood hard decision. Currently, there are many types of detection methods in the industry, and different communication modes have their own detection methods. Herein, because the communication mode in the example is SISO, a detection method is LS detection, that is:

$$\hat{S}_y(k) = \frac{\tilde{R}_y(k) \cdot H(k)}{|H(k)|^2} \quad (3)$$

The maximum likelihood hard decision algorithm is expressed as $\check{S}_y(k) = \arg\min_{\overline{S}_l \in \xi} |\hat{S}_y(k) - \overline{S}_l|^2$, where $\overline{S}_l$ represents a subcarrier symbol that may be sent at a transmitting terminal, and $\xi$ is a set of all symbols that may be sent. A recovered $\check{S}_y(k)$ represents a $k^{th}$ subcarrier symbol (only an information subcarrier) of a $y^{th}$ recovered OFDM symbol.

It is assumed that all symbols that may be sent are the following four symbols:

$$\xi = \{\overline{S}_1, \overline{S}_2, \overline{S}_3, \overline{S}_4\}$$

Then, distance calculations are separately performed, by using $\hat{S}_y(k)$, for the four symbols that may be sent in the set $\xi$:

$$d_{y,l}(k) = |\hat{S}_y(k) - \overline{S}_l|^2, \text{ where } l=1,2,3,4 \quad (4)$$

After that, $\overline{S}_l$ corresponding to the smallest distance of $d_{y,l}(k)$ is selected as maximum likelihood decision value of $\hat{S}_y(k)$. Finally, a recovered $\check{S}_y(k)$ is obtained.

Fourth step: The pilot subcarrier generator generates an original pilot subcarrier of the $y^{th}$ OFDM. The OFDM symbol synthesizer combines an information subcarrier on which a hard decision has been implemented and the generated pilot subcarrier, and a $y^{th}$ original OFDM symbol $\check{S}_y(k)$ (which includes an information subcarrier, a pilot subcarrier, and a DC subcarrier) is reconstructed.

Fifth step: The frequency offset and timing offset estimator performs frequency offset and timing offset phase rotation value estimation based on the reconstructed $y^{th}$ original OFDM symbol $\check{S}_y(k)$, channel estimation information $H(k)$ of the channel estimator, and $\tilde{R}_y(k)$ output by the phase rotation compensator. An estimation algorithm used herein is as follows:

$$a_y = \text{imag}\left\{\frac{\sum_{k=-\frac{N}{2}}^{\frac{N}{2}} \left\{\tilde{R}_y(k) \cdot \left[H(k)\check{S}_y(k)\right]^*\right\}}{\sum_{k=-\frac{N}{2}}^{\frac{N}{2}} \left|H(k)\check{S}_y(k)\right|^2}\right\} \quad (5)$$

$$b_y = \text{imag}\left\{\frac{\sum_{k=-\frac{1}{2}N}^{\frac{1}{2}N} \left\{k \cdot \tilde{R}_y(k) \cdot \left[H(k)\check{S}_y(k)\right]^*\right\}}{\sum_{k=-\frac{1}{2}N}^{\frac{1}{2}N} \left|k \cdot H(k)\check{S}_y(k)\right|^2}\right\} \quad (6)$$

In the foregoing equation (5) and equation (6): (1) $a_y$ and $b_y$ respectively represent a frequency offset phase rotation amount and a timing offset phase rotation amount. (2) imag$\{\bullet\}$ represents obtaining an imaginary part of a value. (3) $[\bullet]^*$ represents a complex conjugate of the value.

Sixth step: A frequency offset phase rotation estimate value and a timing offset phase rotation estimate value are respectively sent to respective loop filters for correction. The structure and the parameters of the loop filter may be determined according to actual requirements. Herein, a parameter $K_p$ of a second-order loop filter is set to 0.25, and $K_i$ is set to 0.125.

Seventh step: The frequency offset phase rotation estimate value and the timing offset phase rotation estimate value corrected by the loop filters are sent to the phase rotation estimate calculator to calculate a phase rotation estimate value of the $k^{th}$ subcarrier. A calculation manner is expressed as $\theta_y'(k) = a_y + k \cdot b_y$, where $\theta_y'(k)$ represents the phase rotation estimate value.

Eighth step: The phase rotation estimate value $\theta_y'(k)$ of the $k^{th}$ subcarrier and phase rotation estimate values of the $k^{th}$ subcarrier of previous y−1 OFDM symbols are accumulated to obtain $\hat{\theta}_{y+1}(k)$, that is, $$\hat{\theta}_{y+1}(k) = \sum_{j=0}^{y} \theta_j'(k).$$

Then, $\hat{\theta}_{y+1}(k)$ is sent to the phase rotation compensator and a phase rotation compensation value in exponential form is generated through table lookup, that is, $e^{-j\hat{\theta}_{y+1}(k)}$. Next, Phase rotation compensation is to be performed on a $(y+1)^{th}$ received OFDM symbol $R_{y+1}(k)$.

Ninth step: Set index y=y+1. If y≤Y, return to the second step; otherwise, end the process.

A person skilled in the art may implement the present invention by using a plurality of variant solutions without departing from the essence and spirit of the present invention. The foregoing descriptions are merely preferably feasible embodiments of the present invention, and are not intended to limit the scope of the present invention. Any equivalent structural change made by using the specification of the present invention and content of the accompanying drawings shall fall within the scope of the present invention.

What is claimed is:

1. An Orthogonal Frequency-Division Multiplexing (OFDM) system synchronization tracking method, comprising steps of:
    A1. performing OFDM symbol segmentation on a received digital signal, sequentially performing a fast Fourier transform (FFT) on OFDM symbols obtained through the segmentation, transforming the OFDM symbols from time domain to frequency domain to obtain a frequency domain OFDM symbol sequence, and sequentially performing step A2 to step A5 on each frequency domain OFDM symbol in the frequency domain OFDM symbol sequence;
    A2. extracting information subcarrier symbols, pilot symbols, and a direct current (DC) subcarrier from a current frequency domain OFDM symbol, detecting and implementing a decision on the information subcarrier symbols, and generating a recovery information subcarrier symbol;
    A3. synthesizing the pilot symbols, the DC subcarrier in the current OFDM symbol and the recovery information subcarrier symbol into a recovery OFDM symbol;
    A4. performing frequency offset estimation and timing offset estimation on the recovery OFDM symbol, to obtain a corresponding frequency offset estimation phase rotation value and a corresponding timing offset estimation phase rotation value; and
    A5. performing phase compensation on a next frequency domain OFDM symbol in the frequency domain OFDM symbol sequence by using the frequency offset estimation phase rotation value and the timing offset estimation phase rotation value, setting the compensated frequency domain OFDM symbol to a current frequency domain OFDM symbol, and returning to the step A2.

2. The OFDM system synchronization tracking method according to claim 1, wherein the step A2 comprises: implementing a hard decision by using a maximum likelihood method, and generating the recovery information subcarrier symbol.

3. The OFDM system synchronization tracking method according to claim 2, wherein the step A4 comprises: correcting the frequency offset estimation phase rotation value and the timing offset estimation phase rotation value by using loop filters, and calculating a new frequency offset estimation phase rotation value and a new timing offset estimation phase rotation value after the correction.

4. The OFDM system synchronization tracking method according to claim 3, wherein the step A4 comprises: the loop filters comprise a frequency offset loop filter and a timing offset loop filter, the frequency offset loop filter is configured to correct the frequency offset estimation phase rotation value, and the timing offset loop filter is configured to correct the timing offset estimation phase rotation value.

5. An Orthogonal Frequency-Division Multiplexing (OFDM) system synchronization tracking apparatus, comprising a receiver front-end apparatus that comprises: a symbol timer, a fast Fourier transformer, a phase rotation compensator, a processor configured as an information subcarrier extractor, the processor further configured as a channel estimator, the processor further configured as a detector, the processor further configured as a pilot subcarrier extractor, the processor further configured as a subcarrier hard decider, an OFDM symbol synthesizer, the processor further configured as a frequency offset and timing offset estimator, a frequency offset loop filter, a timing offset loop filter, and a phase rotation estimate calculator, wherein the symbol timer, the fast Fourier transformer, the phase rotation compensator, the information subcarrier extractor, the detector, the subcarrier hard decider, the OFDM symbol synthesizer, the frequency offset and timing offset estimator, the frequency offset loop filter, and the phase rotation estimate calculator are sequentially connected; the phase rotation compensator, the channel estimator, and the detector are sequentially connected; the information subcarrier extractor, the pilot subcarrier extractor, and the OFDM symbol synthesizer are sequentially connected; the symbol timer is configured to perform OFDM symbol segmentation on a received digital signal; the fast Fourier transformer is configured to sequentially perform a fast Fourier transform (FFT) on the OFDM symbols obtained through the segmentation, and transform the OFDM symbols from time domain to frequency domain to obtain a frequency domain OFDM symbol sequence; the channel estimator is configured to perform channel estimation according to a training sequence transparently transmitted by the phase rotation compensator, to obtain a channel estimate value; the information subcarrier extractor is configured to extract an information subcarrier symbol from a current frequency domain OFDM symbol; the pilot subcarrier extractor is configured to extract a pilot symbol and a direct current (DC) subcarrier from the current frequency domain OFDM symbols; the detector is configured to detect the information subcarrier symbol; the subcarrier hard decider is configured to implement a decision on the information subcarrier symbol and generate a recovery information subcarrier symbol; the OFDM symbol synthesizer is configured to synthesize the pilot symbol and the DC subcarrier in the current OFDM symbol and the recovery information subcarrier symbol into a recovery OFDM symbol; the frequency offset and timing offset estimator is configured to perform frequency offset estimation and timing offset estimation on the recovery OFDM symbol, to obtain a corresponding frequency offset estimation phase rotation value and a corresponding timing offset estimation phase rotation value; the frequency offset loop filter is configured to correct the frequency offset estimation phase rotation value; the timing offset loop filter is configured to correct the timing offset estimation phase rotation value; the phase rotation estimate calculator is configured to calculate the corresponding frequency offset estimation phase rotation value and the corresponding timing offset estimation phase rotation value; and the phase rotation compensator is configured to perform phase compensation on a next frequency domain OFDM symbol in the frequency domain OFDM symbol sequence by using the frequency offset estimation phase rotation value and the timing offset estimation phase rotation value, and the compensated frequency domain OFDM symbol is set to a current frequency domain OFDM symbol.

6. The OFDM system synchronization tracking apparatus according to claim 5, wherein the subcarrier hard decider implements a maximum likelihood hard decision, and generates the recovery information subcarrier symbol.

\* \* \* \* \*